(12) United States Patent
Massoni et al.

(10) Patent No.: US 7,541,585 B2
(45) Date of Patent: Jun. 2, 2009

(54) RADIANT-ENERGY-MEASURING DEVICE WITH TWO POSITIONS

(75) Inventors: Nicolas Massoni, Grenoble (FR); Jean-Louis Ouvrier-Buffet, Sevrier (FR); Andre Perez, Cordeac (FR)

(73) Assignee: Commissariat a l'Energie Atomique, Paris (FR)

( * ) Notice: Subject to any disclaimer, the term of this patent is extended or adjusted under 35 U.S.C. 154(b) by 15 days.

(21) Appl. No.: 10/581,970

(22) PCT Filed: Dec. 6, 2004

(86) PCT No.: PCT/FR2004/050659

§ 371 (c)(1), (2), (4) Date: Jun. 7, 2006

(87) PCT Pub. No.: WO2005/057148

PCT Pub. Date: Jun. 23, 2005

(65) Prior Publication Data

US 2007/0116086 A1    May 24, 2007

(30) Foreign Application Priority Data

Dec. 8, 2003    (FR) ................... 03 51000

(51) Int. Cl.
*G01J 5/20* (2006.01)

(52) U.S. Cl. .................. 250/338.4
(58) Field of Classification Search .......... 250/338.1, 250/338.2, 338.3, 338.4, 338.5, 332, 339.02, 250/343, 352, 370.01, 370.08, 495.1; 338/18; 438/53, 113
See application file for complete search history.

(56) References Cited

U.S. PATENT DOCUMENTS 4,695,715 A    9/1987    Malm

FOREIGN PATENT DOCUMENTS

| EP | 0 566 156 | 10/1993 |
| EP | 0 828 145 | 3/1998 |
| FR | 2 752 299 | 2/1998 |
| WO | 01 81879 | 11/2001 |

OTHER PUBLICATIONS

Richardt, Aime et al.,"Le Vide Les Couches Minces—Les Couches Dures", Editions In Fine, pp. 347-354, 1995.

*Primary Examiner*—David P Porta
*Assistant Examiner*—Kiho Kim
(74) *Attorney, Agent, or Firm*—Oblon, Spivak, McClelland, Maier & Neustadt, P.C.

(57) ABSTRACT

The present invention is directed to a device with two positions for detecting radiant energy e.g. of improved bolometer or micro-bolometer type in terms of detection sensitivity and response time.

63 Claims, 7 Drawing Sheets

RADIANT-ENERGY-MEASURING DEVICE WITH TWO POSITIONS

TECHNICAL AREA

The invention concerns devices for detecting electromagnetic energy, in particular those based on the principle of thermal detection such as bolometers or micro-bolometers.

STATE OF PRIOR ART

Figure 1:
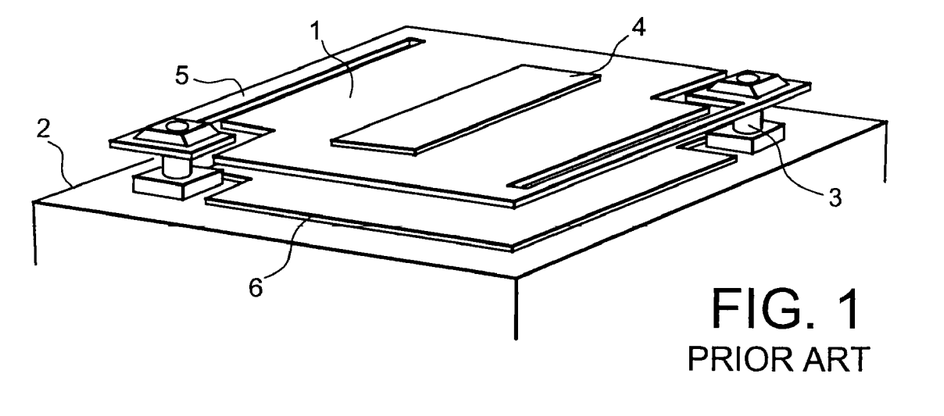
FIG. 1 shows a prior art detector device of radiant energy.

FIG. 1 shows a prior art device for detecting electromagnetic radiation. This device comprises firstly a thin membrane 1 absorbent to incident electromagnetic radiation. This membrane 1 is in suspension over a carrier 2 via anchor points 3. Under the effect of electromagnetic radiation, the membrane is able to heat and transmit its temperature to a layer 4, generally a thin layer, deposited on the membrane 1 and which can act as thermometer. This layer 4 may be semi-conducting comprising for example one or more thermistors enabling the conversion of radiant energy into an electric measurement signal.

The carrier 2 may be a semiconductor substrate, in silicon for example, and may include one or more integrated electronic processing circuits for example comprising means for polarizing layer 4 and thermometer reading means (not shown in the figure). This substrate 2 may also comprise one more multiplexing components used to place in series the measured electric signals derived from the different thermistors for example and to transmit these signals to a reduced number of outputs possibly used by an imaging system. The detector device may also comprise a thermal insulation device 5 to limit heat losses of the membrane and thereby improve the sensitivity of the detector device. A layer 6 reflecting the electromagnetic radiation is placed on the substrate 2. The distance between this layer 6 and the membrane 1 is dictated by the height of the anchor points 3. This distance is preferably equal to one quarter of the detected wavelength in order to set up a quarter wavelength cavity making it possible to increase the absorption of the membrane.

The thermal insulation means 5 are in the form of oblong parts attached to the membrane 1. The length of these parts is preferably as high as possible with a section (product of width by thickness) as narrow as possible. In addition to their thermal insulation role, these oblong parts also enable the suspending of the membrane 1 and its mechanical holding above the substrate 2. These parts can also give support to an electricity conductor layer connecting the terminals of the thermistors to inputs of the above-mentioned reading means or polarizing means.

To couple a detector such as previously described to imaging systems, it is desired in particular to improve its sensitivity and its response time.

To improve its sensitivity, it is endeavoured to reduce the thermal conductance of the oblong parts 5, e.g. by making them as long as possible with the lowest possible section.

However, the mechanical resistance of the suspended membrane may be affected by these changes. This operation may result in a deflection of the oblong parts 5 which may lead to tilting of the absorbing membrane, possible going as far as contact with the substrate 2. Deflection of the membrane must be avoided to maintain its good thermal insulation.

Regarding the improvement in the detector's response time, one method may consist of making the thermal resistance of the oblong parts, and the calorific capacity of the membrane, as low as possible. These parameters generally depend upon the thickness of the membrane. Hence, one way of improving response time could be to reduce the thickness of the membrane. But the effect of this reduction could be the generation of additional thermal noise which would disturb the detector.

As a general rule, the sensitivity of prior art detectors is affected by thermal leakages caused by their electric interconnections. In addition, their response time still remains too limited.

DESCRIPTION OF THE INVENTION

The present invention puts forward a device for measuring or detecting radiant energy that is an improvement on prior art devices, in particular in terms of detection sensitivity and response time.

It concerns a device for measuring radiant energy, comprising:
- a carrier comprising first means enabling absorption of radiant energy, and second means able to provide one or more electric signals in relation to the absorbed radiant energy,
- a substrate comprising means for reading said electric signals, the carrier being mobile with respect to the substrate.

The invention also concerns a device for measuring radiant energy, comprising:
- a carrier comprising first means enabling absorption of radiant energy, and second means able to provide one or more electric signals in relation to absorbed radiant energy,
- a substrate comprising means for reading said electric signals, said first means being mobile with respect to the reading means.

The first means can be formed of at least one membrane or layer enabling absorption of electromagnetic rays. The second means may be formed for example of a least one semiconductor layer to which the membrane is able to transmit the absorbed radiant energy. The semiconductor layer may be adjoined to the membrane or integrated therein. The first and second means are preferably integrated in one same carrier. The second means may produce one or more electric signals in relation to the transmitted radiant energy. They may include one or more thermistors, formed for example in said semiconductor layer.

By <<substrate>> is meant an object acting as a support for the reading means. According to one particular characteristic of the device, the substrate may be semi-conductive. But the invention is not limited however to microelectronic devices.

The substrate may comprise one or more integrated circuits connected, for example, to the reading means and enabling the processing of said electric signals. These circuits may, for example, include a multiplexer making it possible to put in series the electric signals derived from different thermistors integrated in the second means. The substrate may also comprise one or more circuits allowing the polarization of the second means.

By <<reading means>> is meant conductor pads or conductor zones of the substrate able to enter into contact with other conductor zones of the carrier conveying said electric measurement signals.

In the prior art detection devices, like the one illustrated FIG. 1 and previously described, the carrier is fixed with respect to the substrate and could only take up a single position.

The device according to the invention is able to take up different positions depending upon whether it lies in a phase during which it detects or measures radiant energy, or in a phase during which it conducts reading of this measurement.

During a measurement or acquisition phase, the first means must be able to heat whilst limiting heat losses. The detection device can then take up a first position in which the first means have maximum insulation from a thermal viewpoint. In this position, it is endeavoured to limit the thermal leakages induced for example by electric connections. In this manner the sensitivity of the detection device can be improved.

During a measurement reading phase, the reading means are in contact with conductor zones of the carrier and either acquire or read said electric signals produced by said second means. At the same time, the first means cool down. The device of the invention, during this phase, is then able to take up a second position in which the first means are this time placed in a position of low thermal insulation. The rate of cooling of the first means is thereby improved compared with prior art devices and the response time of the device according to the invention is faster.

In addition to the improvement in the detector's speed and sensitivity, the changeover from one position with high thermal insulation to a position with low thermal insulation can afford protection to the first absorbing means in the event of overheating.

For example, if an absorbing membrane is exposed to electromagnetic radiation that is too intense, device according to the invention can suddenly cause the absorbing membrane to change over from the high thermal insulation position to the low thermal insulation position. The risk of damage to this membrane subsequent to any overheating is thereby reduced.

The changeover from the high thermal insulation position to the low thermal insulation position can be made in several ways. For example this changeover may be achieved through movement of the carrier with respect to the reading means.

According to one embodiment, it is said first means which are able to move. In this case, according to a first variant, the reading means may also move. According to a second variant, the reading means remain fixed.

According to one particular characteristic of the detection device according to the invention, it may take up one position in which the second means are not electrically connected to the reading means. This position may be taken up by the device when it conducts a detection, to limit heat losses.

During a detection phase, the device according to the invention can also take up a position during which the substrate and the carrier are is connected or attached solely via the insulating zones. By <<insolating zones >> is meant, for example, insulating pads positioned on the carrier or/and on the substrate. The insulating zones may also be insulating suspending means for example, allowing attachment of the carrier and substrate whilst maintaining one at a distance from the other. The insulating pads or insulating suspending devices are preferably made in a material with very high thermal insulation such as a polymer, resin, aerogel, dielectric material with low dielectric constant (<<low-k >>).

When the substrate and carrier are independent, during a heating phase of the first absorbing means, the device according to the invention is able to take up a position in which the carrier is neither attached to nor in contact with the substrate. Therefore, the carrier can be held in levitation with respect to the substrate, e.g. via electromagnetic or electrostatic forces. These forces may be produced by actuating means such as electrodes positioned on the carrier or/and substrate.

The radiant energy detection device of the invention is able to take up another position in which the second means are electrically connected to the reading means. This other position may be taken up by the detector during a reading phase, for example to enable one or more circuits integrated in the substrate to acquire electric measurement signals. This position may also enable polarization of the second means. It also allows the first absorbing means to cool rapidly.

The reading means are preferably made in a material with low thermal resistance to allow the first absorbing means to cool as quickly as possible.

During a measurement reading phase, the device according to the invention may take up a position in which conductor zones of the carrier, conveying electric measurement signals for example, are in contact with other conductive zones of the substrate. These other conductive zones of the substrate may comprise the reading means in the form of conductive pads. Some of these conductive zones of the substrate may also comprise zones of low thermal resistance, in addition to the reading means. The additional zones, in the event of contact with the first means, are then used to cool these first means even faster.

In the radiant energy detection device according to the invention, the substrate and the carrier may or may not be joined.

If the carrier and the substrate are independent, the changeover by the first means from a position of high thermal insulation to a position of low thermal insulation can be both quick and contactless.

To cause the reading means to move with respect to the first absorbing means, the detection device according to the invention may also include actuating means. These actuating means may also be used to hold the device in a measurement position or in a reading position.

The actuating means, according to a first variant, may enable displacement of the carrier. According to a second variant, they may enable displacement of the reading means. They may also be used to move both the carrier and the reading means.

The actuating means may be of thermomechanical type, or piezoelectric or electromagnetic or electrostatic. They may also be a combination of thermomechanical or/and piezoelectric or/and electromagnetic or/and electrostatic means.

For example, if actuation is electrostatic, these means may comprise one or more electrodes belonging to the carrier or/and one or more electrodes belonging to the substrate. These electrodes, according to the potentials to which they are adjusted, may displace the carrier with respect to the substrate. If actuation is piezoelectric for example, the reading means may be capable of elongation to enter into contact with the carrier.

The detector device of radiant energy according to the invention may be a bolometer for example, or a micro-bolometer. According to one particular characteristic of the invention, it may be implemented using thin layer processes. For example, it may be in the form of a micro-electronic mechanical system (MEMS) or be integrated in a MEMS.

BRIEF DESCRIPTION OF THE DRAWINGS

The present invention will be better understood on reading the description of examples given merely for illustrative purposes and in no way restrictive, with reference to the appended drawings in which.

The different parts shown in the figures are not necessarily drawn to uniform scale, for better legibility of the figures.

DETAILED DESCRIPTION OF PARTICULAR EMBODIMENTS

The invention concerns a device for detecting electromagnetic radiation or radiant energy. This device is able to take up different positions according to whether it lies in a detection phase or radiant energy measurement phase, or in a reading phase to read the measurement it has just taken.

Figure 2A:
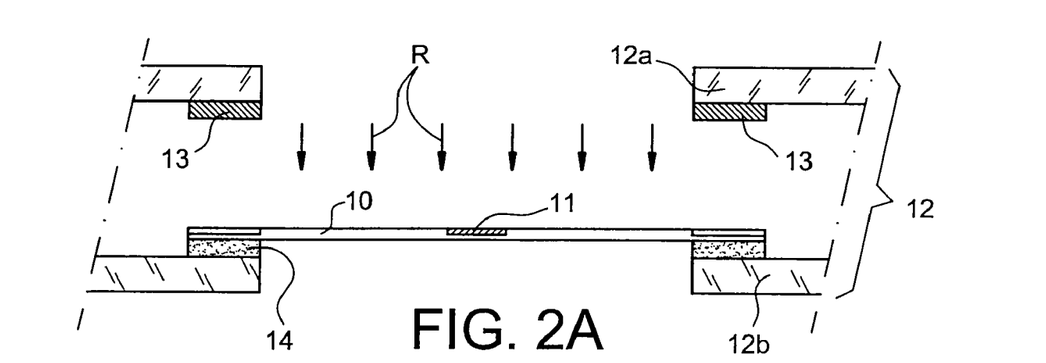
FIG. 2A shows a position which may be taken up by an example device according to the invention to detect radiant energy, when it is in a measurement phase of electromagnetic radiant.

FIG. 2A illustrates an example detection device of the invention. This device is shown in cross section during a detection phase during which it is subjected to incident electromagnetic rays R.

The detection device comprises first absorbing means of electromagnetic radiation in the form of a membrane 10. Under the effect of electromagnetic radiation, the membrane 10 heats and transmits the absorbed radiant energy to second conversion means, enabling this radiant energy to be converted into one or more electric measurement signals. These second means are in the form of a layer 11 adjoined to the membrane 10. The membrane 10 may be made in a dielectric material for example, such as: SiO, $SiO_2$, SiN, $Si_3N_4$. The layer 11 may be metallic or semi-conductive, e.g. silicon-based.

The membrane 10 is encompassed at least in part in a substrate 12 comprising an upper part denoted 12a located above the membrane 10 and a lower part 12b located below membrane 10. The substrate 12 may be semi-conductive, e.g. silicon-based. It comprises reading means with which to acquire said electric measurement signals. These reading means are in the form of conductor pads 13 arranged on its upper part 12a. The substrate 12 may also comprise one or more integrated electronic circuits (not shown) connected to these conductor pads 13 enabling the processing of these electric signals. The substrate 12 may also comprise a circuit enabling polarization of layer 11 if it is semi-conductive. It is also provided with insulating pads 14 on its lower part 12b.

During the detection phase, the device takes up a position in which the membrane 10 rests on the insulating pads 14 and is in contact solely therewith. The membrane 10 lies in a thermal insulation position, propitious to optimal heating. The insulating pads 14 are preferably made in a material with high thermal resistance, such as a polymer, resin, or a porous dielectric material.

When heating of the membrane is completed, its temperature stabilizes at a detection value translated by layer 11 into electric measurement signals. The detection phase can therefore terminate. The device subsequently enters into a measurement reading phase.

Figure 2B:
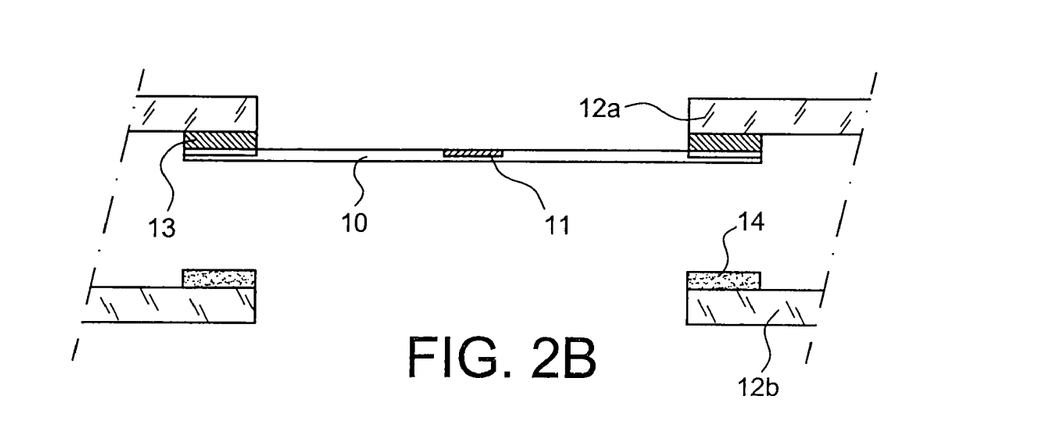
FIG. 2B shows a position which may be taken up by an example device according to the invention to detect radiant energy, when it is in a reading phase to read electric measurement signals of electromagnetic radiation.

It then takes up a second position illustrated FIG. 2B. In this position, the membrane lies flat against the conductor pads 13 located on the upper part of the substrate 12a. It is then in a position of low thermal insulation.

The conductor pads 13 form reading means, for example allowing one or more electronic circuits integrated in the substrate 12 to acquire said electric measurement signals. This reading is generally very short, lasting for example between 1 and 50 μs. At the same time as reading is conducted, the membrane cools. Cooling is generally longer than reading, e.g. in the order of 1 ms. However, it should preferably be as rapid as possible so that the detection device is again ready to take a measurement.

The conductor pads 13 preferably have a thermal resistance that is as low as possible to allow rapid cooling of the membrane. They may be made in a metal-based material such as copper, aluminium, silver, nickel, gold.

The detection device according to the invention can therefore take up at least one first position specific to a measurement phase, i.e. when the membrane heats, and at least one second specific position to read this measurement.

The changeover from the first to the second position may be produced through the relative displacement of the membrane and reading means. According to one particular embodiment of the invention, the membrane can move whilst the reading means remain fixed. According to another embodiment, the reading means and the membrane may both be caused to move.

Displacement can be achieved using actuating means located on the substrate for example and on the membrane. These actuating means (not shown FIGS. 2A et 2B) may be of electromagnetic or electrostatic type, and allow displacement of the membrane via electromagnetic or electrostatic forces. The actuating means may also be of piezoelectric or thermomechanical type, e.g. in the form of one or more thermal switches.

The actuating means may be chosen in relation to their performances in terms of consumption and response time.

Figure 3A:
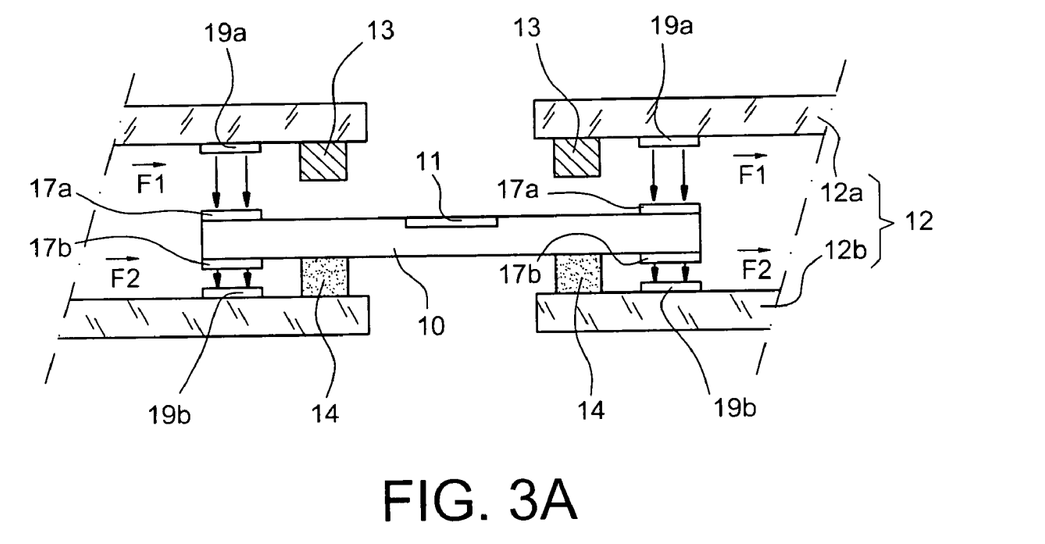
FIG. 3A shows an example device according to the invention to detect radiant energy which is maintained by actuating means in a measurement position.
Figure 3B:
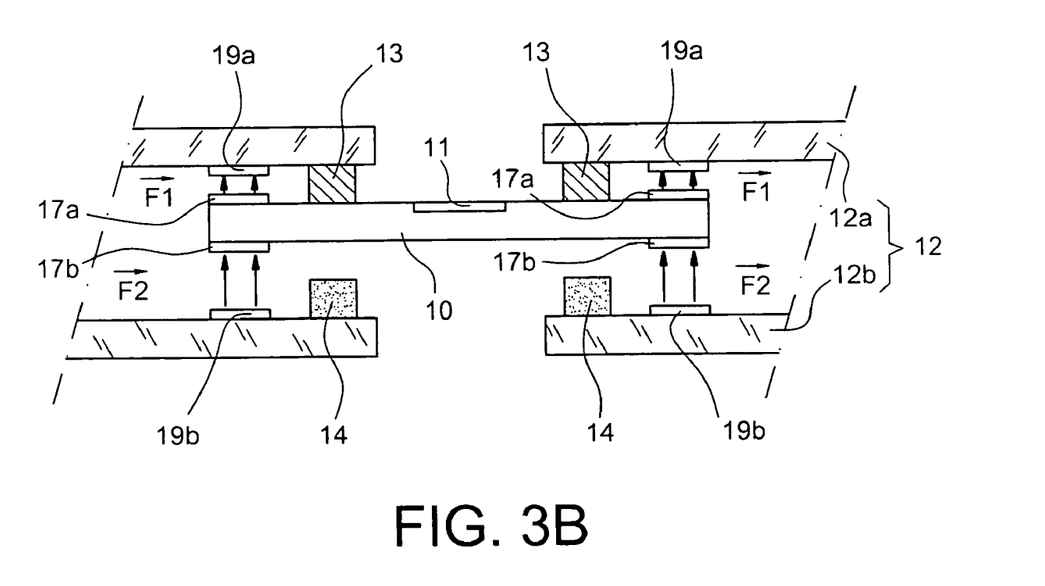
FIG. 3B is an example device according to the invention to detect radiant energy maintained by actuating means in a reading position to read a measurement of electromagnetic radiation.

FIG. 3A and 3B show an example of a device according to the invention, of the type illustrated FIGS. 2A et 2B, in that the substrate 12 and the membrane are provided with electrostatic actuating means to displace the membrane. These actuating means are in the form of electrodes, of which some denoted 17a and 17b are respectively located on and under the membrane 10. Other electrodes 19a and 19b are respectively located on the upper part 12a and lower part 12b of the substrate 12. The electrodes, depending on the potentials at which they are each set, allow the creation of electrostatic forces denoted $F_1$ and $F_2$. These forces have intensities and directions which vary in relation to the potentials at which they are each set. The electrostatic forces can move the membrane 10 but they can also hold it in a first position for heating or measurement (FIG. 3A) or in a second position to read the measurement or for cooling of the membrane 10 (FIG. 3B).

Figure 4:
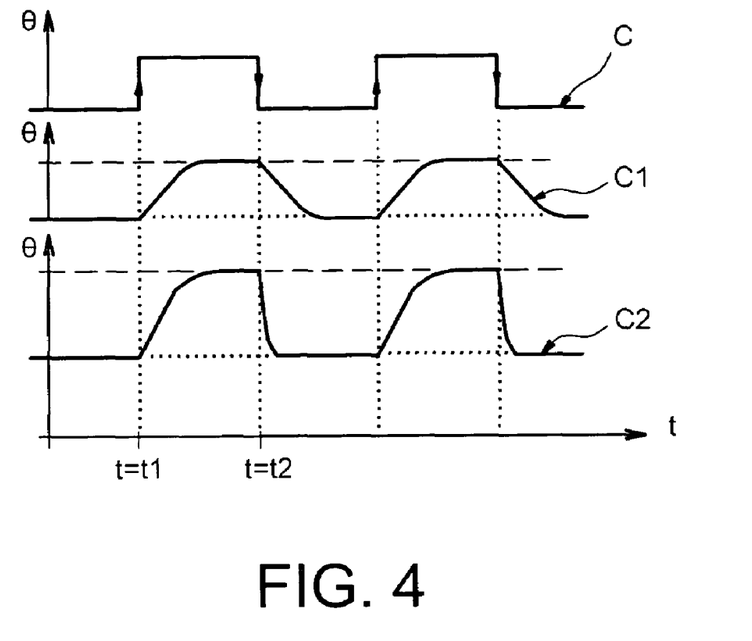
FIG. 4 shows a comparison of temperature response curves of a prior art device and of a device according to the invention, when they are both subjected to constant, repetitive heating.

FIG. 4 illustrates plotted curves $C_1$ and $C_2$ of time responses to temperature □ of a prior art radiant energy detector device, as illustrated FIG. 1, and of a detector device according to the invention. These devices are periodically subjected to constant radiant energy modelled by a crenel curve C.

Subsequent to sudden heating occurring at time $t=t_1$, the prior art detector and the detector according to the invention respond at different time constants. Heating is modelled by a rising front on curve C at $t=t_1$.

The response of the detector according to the invention is faster than that of the prior art detector. Curves $C_1$ and $C_2$, on and after $t=t_1$, both show exponential growth. But curve $C_2$, corresponding to the detector according to the invention has a higher growth rate than curve $C_1$. Therefore, the membrane in the detection device according to the invention can heat quicker than the membrane of the prior art detector device.

Exposure to radiant energy stops at a time $t=t_2$ modelled by a falling front on curve C.

The prior art and detectors according to the invention again respond at different time constants. Curves $C_1$ and $C_2$ both show exponential falling off, but curve $C_2$ corresponding to the inventive device shows a faster drop than curve $C_1$. Therefore, in the detector detection device according to the invention, the membrane is able to cool quicker than the membrane in the prior art detector device. With the detector device according to the invention it is therefore possible to conduct measurements at a higher frequency than with the prior art device. Its cooling rate may be in the order of 5 to 10 times higher than with prior art devices.

Figure 5:
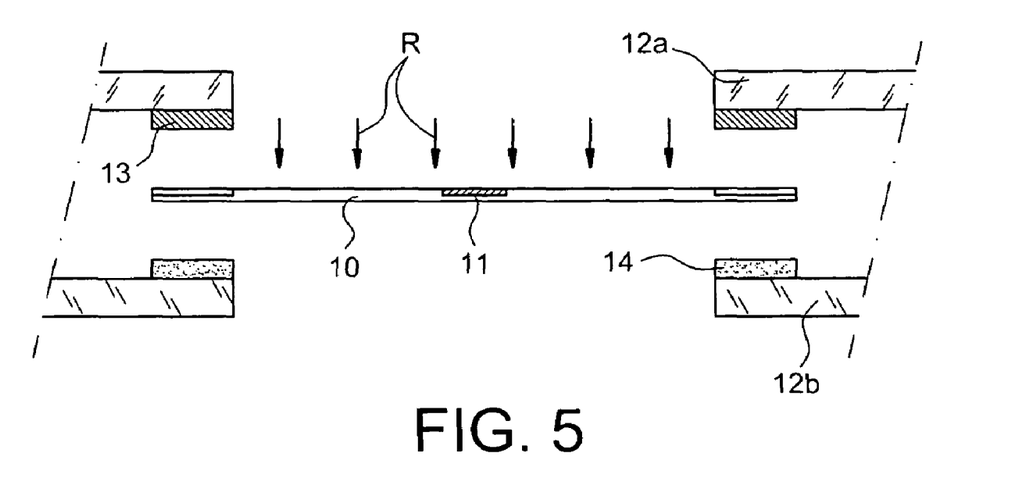
FIGS. 5, 6, 7A-7B, 8A-8B, 9 show different variants of radiant energy detection devices according to the invention.

FIG. 5 illustrates a variant position which may be taken up by the device according to the invention during a detection or heating phase for example. In this position the membrane 10 and the layer 11, during a heating phase, are in levitation between the upper part 12a and lower part 12b of the substrate 12. The membrane 10 does not enter into contact with any other part, the insulating pads 14 then being optional. Its thermal insulation is hence further improved compared with the device in FIG. 2A. Maintaining in this position may be ensured by electromagnetic or electrostatic actuation means for example (not shown). Electrostatic actuation means may be formed for example of electrodes positioned on the membrane 10 and on the substrate 12, as in the example illustrated previously in FIGS. 3A and 3B. To produce electrostatic forces enabling the membrane to be held away from the substrate, these electrodes may be set at equal and non-zero potentials.

Figure 6:
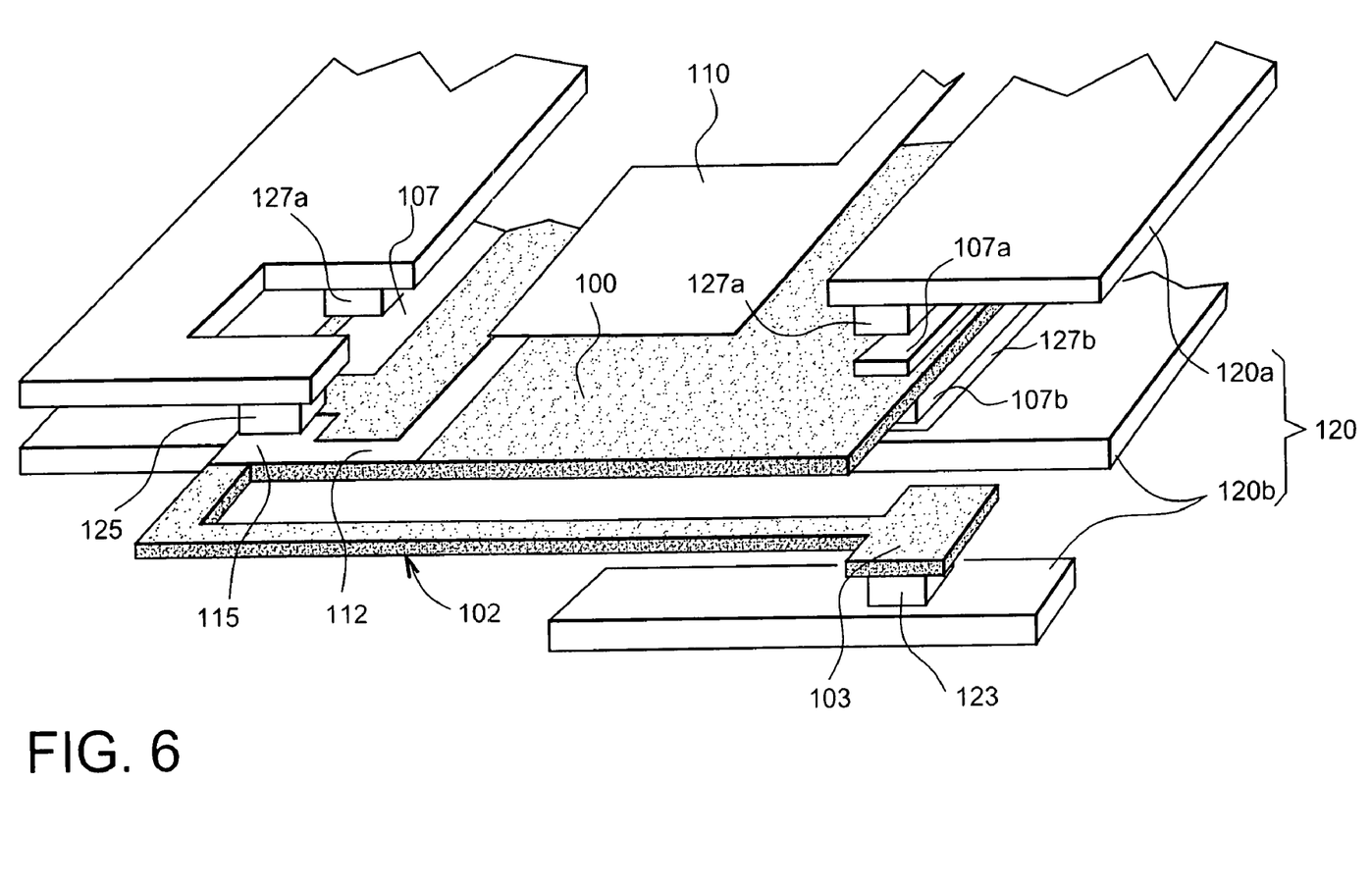

A more detailed example of the inventive detector device is illustrated in a perspective, cross-sectional view in FIG. 6. This example of the device may in integrated in a microelectronic mechanical system (MEMS) and produced in thin layers.

Firstly, it comprises a membrane 100 enabling to absorb incident radiant energy. The thickness of this membrane 100 is between 10 nanometers and 10 micrometers for example, and may be made using a dielectric material such as: SiO, $SiO_2$, SiN, $Si_3N_4$.

The membrane is coated with a thin layer 110 e.g. semiconductive. This thin layer 110 can convert thermal energy into one or more electric signals in relation to this energy. The membrane 100 is partly encompassed in a substrate 120 comprising an upper part 120a located above it and a lower part 120b located below it. The substrate 120 may be semi-conductive, in silicon for example. The membrane is provided with suspending means with respect to the substrate, e.g. oblong L-shaped parts 102 attached to each side of the membrane 100. These parts 102 have terminations 103 that are rectangular for example, positioned facing the insulating pads 123 arranged on the lower part 120b of substrate 120.

The membrane 100 is mechanically joined to the substrate 120, but it can take up several positions. In a first position, the membrane 100 rests on the insulating pads 123 via terminations 103. According to one variant, this first position may be a <<rest>> position of the membrane not requiring any forces external to the membrane to be maintained. According to another variant, this first position may be maintained via forces external to the membrane, e.g. electrostatic forces under which it can be caused to lie flat against the insulating pads 123

In both cases, this position is the one that will be taken up by the detection device when taking a measurement for example. This position will be called: <<heating position>>.

In the heating position, the membrane 100 is solely in contact with the insulating pads 123. It is in a position of high thermal insulation, accumulating the thermal resistance of the suspending means with the thermal resistance of the contacts or insulating pads 123. These may be made from a dielectric material, preferably having very high thermal insulation. This material could be a polymer e.g. polyimide, an aerogel or a dielectric with low dielectric constant (<<low-k>>).

Under the effect of electromagnetic radiation, the membrane is able to heat and transmit its heat to the thin layer 110. This thin layer 110 may include one or more thermistors to allow the producing of electric measurement signals in relation to the heating of the membrane 100. Conductor lines 112, connected to the thin layer 110, are arranged on the upper surface of the membrane 100 to convey the electric measurement signals derived from layer 110. Some of these conductor lines 112 may also be used to convey polarization signals intended for layer 110 and derived for example from the substrate 120. The conductor lines 112 end in conductor zones 115 positioned facing conductor pads 125 on the substrate 120.

The membrane 100 is able to take up a second position in which the conductor pads 125 connect with the conductor zones 115. This second position will be called the <<reading position>>. It can for example allow an electronic circuit integrated in the substrate and connected to the conductor pads 115 to acquire electric measurement signals.

In <<reading position>>, the conductor pads may also enable the membrane 100 to evacuate at least part of the thermal energy it has just stored, e.g. during the detection phase. Therefore, the conductor pads 100 preferably have the lowest thermal resistance possible to enable the membrane to cool quickly. These pads may for example be made in a metal-based material e.g. copper, silver, nickel, gold . . . .

The changeover from the heating position to the reading position may be made via a vertical displacement of the membrane with respect to the conductor pads 125 of the substrate 120. This displacement may be achieved using actuating electrodes also able to hold the membrane in the heating position or in the reading position.

Some of these actuating electrodes denoted 107a and 107b are located on and under the membrane 100 respectively. Others denoted 127a and 127b are respectively located on the upper part 127a and lower part 127b of the substrate 120. Depending upon the potentials at which they are set, the electrodes can enable displacement of the membrane by means of electrostatic forces, or they can enable maintaining of the membrane in the first or second position. Electrodes 107a and 107b of the membrane can for example be non-polarized and held at a constant potential $V_1$ of 0 volt. Electrodes 127a and 127b of substrate 120 may have a variable potential $V_2$ in relation to the displacement it is desired to obtain.

These actuating electrodes may for example be made in a metal-based material e.g. TiN, Ti, TiN, Pt, Ag, Au, Cr, Al, ITO (Indium Tin Oxide), Cu, W, Ni.

According to one particular characteristic of the device, conductor pads 125 and insulator pads 123 of sufficient thickness may prevent electrodes 107a and 107b of membrane 100 and electrodes 127a and 127b of the substrate 120 from entering into contact with each other, whilst remaining close to one another. With this characteristic, when the device is in reading position for example, it is possible to maintain high attraction between the conductor pads 125 and the conductor zones 115. Electric contact with the reading means and membrane cooling can thereby be improved.

Figure 7A:
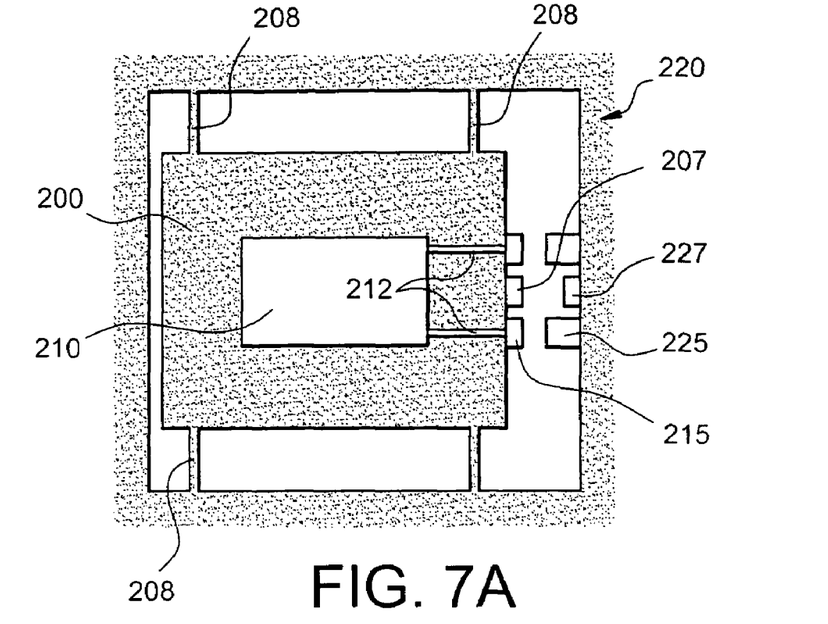
Figure 7B:
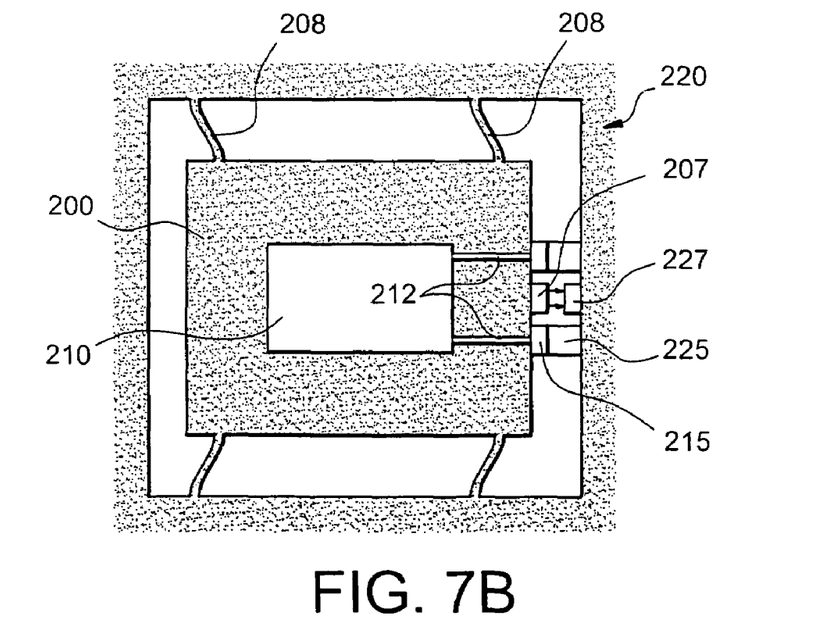

Another example of an inventive detection device, simpler to implement than the previous example, will now be described. It is illustrated in FIGS. 7A and 7B.

This detection device firstly comprises a membrane 200, similar to the one in the preceding device. This membrane is coated with a thin layer 210 allowing transmitted radiant energy to be converted into one or more electric measurement signals.

The membrane 200 is mechanically joined to a substrate 220 surrounding it. Suspending means in the form of rods 208 connect the substrate 220 and membrane 200 and hold the membrane in suspension. The rods 208 are preferably made in flexible insulating material such as a polymer.

The membrane 200 can take up a first position (FIG. 7A) called the <<heating position>>, e.g. during a measurement phase of incident radiant energy. In this first position, the membrane 200 is held in suspension by the rods 208, and its only contact with the substrate 220 is via the insulating rods 208. These act as thermal insulator.

This position is a rest position insofar as in order to be maintained it does not require any external force, aside from the maintaining ensured by the rods. In this position, the membrane is able to heat avoiding any contact which may generate heat losses with the conductor parts of carrier 200. During detection of radiant energy, heating of the membrane 200 is retransmitted to layer 210 which converts this heat into electric measurement signals. Conductor lines 212 connected to the layer 210 are arranged on the surface of the membrane 200 and can be used in particular to convey the electric measurement signals. These lines 210 lead into conductor zones 215 located on the face of membrane 200. The conductor zones 215 lie facing conductor pads 225 located on the substrate 220 with which they are able to connect.

Once detection is completed, the membrane 200 can be displaced over a horizontal plane to cause it to take up a second position in which the conductor pads 225 are connected to the conductor zones 215 (FIG. 7b). This second position, in which the membrane 200 is in contact with the substrate 220, may for example enable an electronic circuit integrated in the substrate 220 (not shown) to acquire measurement signals derived from layer 210. In the second position, the conductor pads 225 may act as reading means to read measurement signals. They can also be used to facilitate the evacuation of thermal energy which the membrane has just stored during detection.

Horizontal displacement of the membrane and maintaining the membrane in the second position can be achieved via first actuating electrodes 207 positioned on a face of the membrane 200 and via second actuating electrodes 227 positioned on the substrate 220. The first 207 and second 227 actuating electrodes face one another. By causing their respective potentials to vary, the membrane can be caused to move. The first electrodes 207 positioned on the membrane may be non-polarized for example and maintained at a constant potential $V_1$ of 0 volt. Electrodes 227 of substrate 220 may have a variable potential $V_2$. When $V_2$ is set at a potential higher than 0 volt, the first electrodes 207 of the membrane are then attracted by the second electrodes of the substrate 220. The membrane then moves over a horizontal plane and comes to lie flat against the conductor pads 225. It thereby takes up the reading position (FIG. 7B).

With electrostatic actuating means, it is possible to use a <<sticking>> effect of the electrodes. This sticking effect occurs when the actuating electrodes positioned at an initial distance opposite one another, move closer to lie at another distance that is less than one third of the initial distance. The electrodes then have a propensity to stick to one another.

According to one variant, during the reading position, the electrodes positioned on the membrane and those positioned on the substrate can be held at a distance from each other that is non-zero and less than one third of the distance at which they lay during the measurement position. The previously described <<sticking>> effect can then be used to produce a strong attraction between the conductor zones of the membrane and the conductor pads of the substrate.

The potential of the electrodes can be controlled for example by a circuit integrated in the substrate 220, using a periodic signal. In this case, it is preferable for the period of this signal to be chosen so that the membrane is unable to enter into resonance. This could disturb the functioning of the detector and possibly damage the membrane.

Figure 8A:
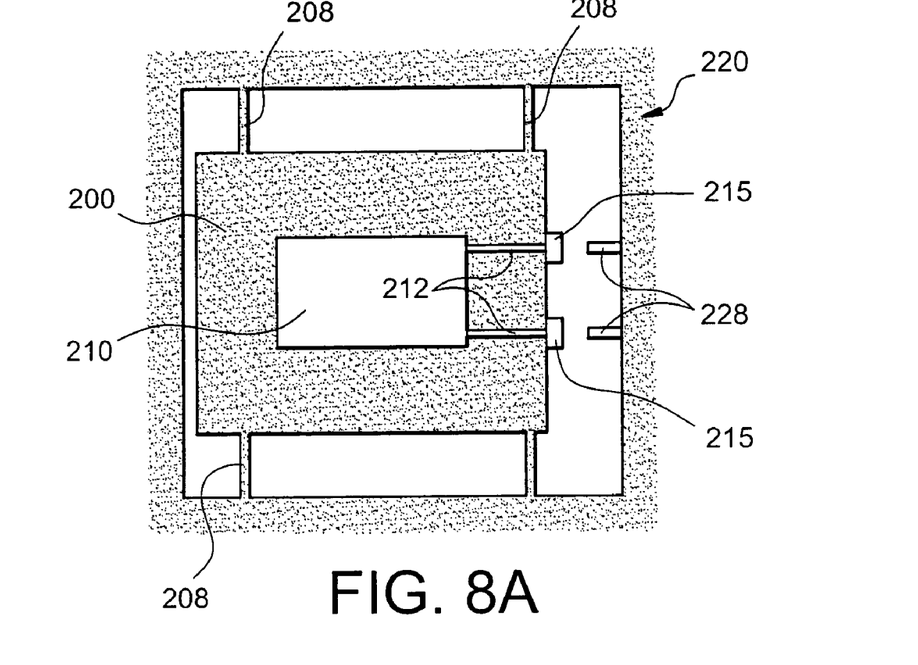
Figure 8B:
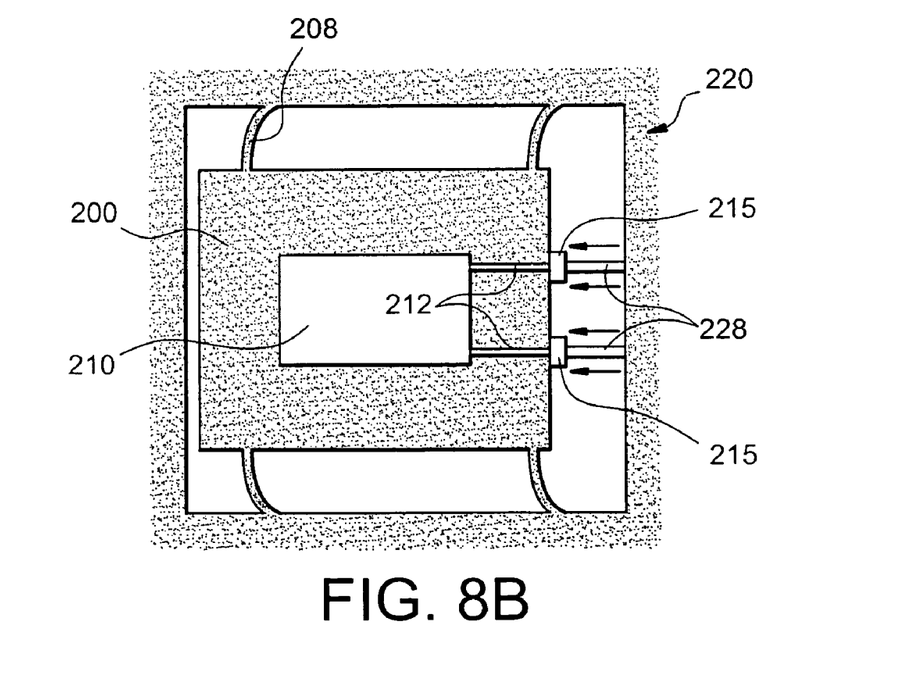

FIGS. 8A and 8B illustrate another example of a detection device. This device differs from the preceding one in particular regarding the membrane actuating means and the reading means of the measurement signals.

The conductor pads 225 acting as reading means are replaced by other pads 228 e.g. containing a core in a piezo-electric material such as quartz, coated with a thin conductive layer. These pads 228 may elongate under the action of an electric voltage derived for example from a circuit integrated in the substrate 220. In this embodiment, the membrane may also be moved. The detection device is also able to take up the previously mentioned <<heating >> and <<reading>> positions. This time these positions are achieved by displacement of the pads 228 using a piezo-electric effect.

According to one variant, during the heating position (FIG. 8A), the pads 228 are not subjected to any electric actuation. The pads do not enter into contact with the conductor zones 215 of the membrane 200.

Subsequently, so that the detection device can change over to reading position, an electric voltage is applied on the piezo-electric material forming the core of pads 228. The pads then lengthen to come into contact with the conductor zones 215. The membrane 200 is then held in suspension but moves by means of flexible rods 208 which become deformed (FIG. 8B).

Figure 9:
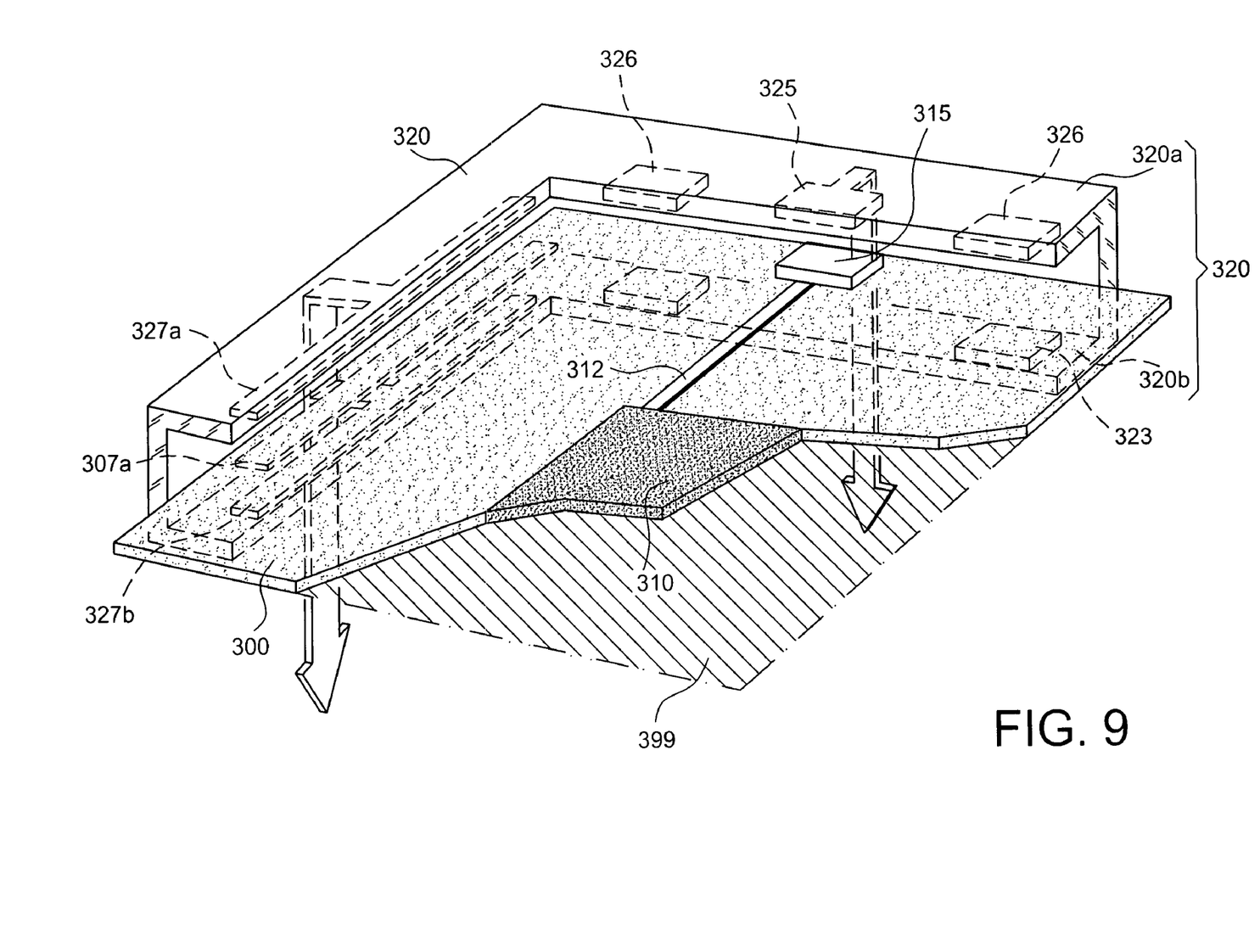

FIG. 9 illustrates a cross-sectional, perspective view of another example of an inventive detection device, similar to the one illustrated FIG. 6. It comprises a membrane 300 absorbing electromagnetic radiation, coated with semi-conductive layer 310 comprising one or more thermistors enabling the production of electric measurement signals. Conductor lines 312 connected to the layer 310 lead into contact zones 315 permitting the conveying of the electric signals.

A substrate 320, independent of the membrane 300, encompasses the membrane entirely. This substrate 320 comprises firstly a lower part 320b provided with four insulator pads 323 (only two are shown). In heating position, the membrane 300 rests directly on these pads. The lower part 320b of substrate 320 is also provided with a layer 399, allowing reflection of the electric radiation. This layer 399 enables optimised heating of the membrane 300 during a heating phase.

The substrate 320 also comprises an upper part provided with conductor pads 325, 326. Some of these conductor pads, denoted 325, act as reading means for the electric signals and allow cooling of the membrane when the device is in <<reading>> position, i.e. when the membrane 300 lies flat against the conductor pads 325, 326.

Other pads, denoted 326, form additional zones with low thermal resistance. They can promote cooling of the membrane 300 when it is in <<reading>> position.

As for the example embodiment illustrated FIG. 6, the changeover from a heating position or measurement position to another position for measurement reading is obtained by means of actuating electrodes of which some 327*a* and 327*b* are respectively positioned on the upper 320*a* and lower 320*b* parts of the substrate 320. Other electrodes 307*a* and 307*b* are positioned on each of the faces of the membrane (only the one on the upper face of the membrane is shown). According to the potentials at which each of these electrodes is set, the membrane is able to move, or to remain in a measurement position or in a measurement reading position. In this example embodiment, displacement of the membrane is advantageously made without contact with another element of the device.

Devices such as those illustrated and described above may be implemented in thin layers.

An example of a method to fabricate a device illustrated FIG. 9 will now be described.

The substrate 320 may be formed from a semiconductor substrate. The actuating electrodes of the substrate 320 can, for example, be formed by cathode sputtering, vapour phase or evaporation chemical deposit. Then by chemical or plasma etching, or the <<lift-off>> method.

The membrane can be made on a first sacrificial layer in polyimide with a thickness of between 1 and 5 µm for example, preferably equal to one quarter of the wavelength of the radiation to be detected. The electrodes positioned on the membrane may be fabricated at the same time as the membrane.

Subsequently, a second sacrificial layer is deposited, e.g. polyimide-based with a thickness of between 0.2 and 5 µm for example.

The conductor pads may be fabricated using conventional depositing techniques such as vapour phase chemical deposit, and etching such as chemical etching.

Etching is then conducted e.g. dry etching of the sacrificial layers by microwave, oxygen plasma for example to release the membrane.

Information on these different steps of the process can also be found in document FR 2 752 299, or in the work on vacuums and thin layer depositing: <<La pratique du vide et des dépôts de couches minces>>, by Richardt-Durand, Editions In Fine, 1995.

The invention claimed is:

1. A device for measuring radiant energy comprising:
   a carrier including first means allowing absorption of radiant energy, and second means enabling provision of one or more electric signals in relation to the absorbed radiant energy; and
   a substrate including reading means for reading the electric signals,
   wherein the substrate surrounds the carrier and is mechanically joined to the substrate by a suspending means, the carrier being mobile relative to the substrate, and being able to move along a horizontal plane in parallel to the carrier.

2. A device for measuring radiant energy according to claim 1, the reading means being fixed.

3. A device for measuring radiant energy according to claim 1, the reading means being deformable.

4. A device for measuring radiant energy according to claim 3, the first means being movable and the reading means being deformable.

5. A device for measuring radiant energy according to claim 1, configured to take up a position in which the second means is not electrically connected to the reading means.

6. A device for reassuring radiant energy according to claim 5, the position being a position in which the device is configured to take a measurement.

7. A device for measuring radiant energy according to claim 5, the position being a position in which the first means is configured to heat.

8. A device for measuring radiant energy according to claim 5, configured to take up at least one other position in which the second means is electrically connected to the reading means.

9. A device for measuring radiant energy according to claim 8, the other position being a position in which the reading means is configured to acquire the electric signals.

10. A device for measuring radiant energy according to claim 8, the other position being a position in which the first means is configured to cool.

11. A device for measuring radiant energy according to claim 5, configured to take up at least one other position in which conductor zones of the carrier are in contact with the reading means of the substrate.

12. A device for measuring radiant energy according to claim 1, configured to take up a position in which the substrate and the carrier are connected or attached solely by insulating zones belonging to at least one of the carrier or the substrate.

13. A device for measuring radiant energy according to claim 12, configured to take up at least one other position in which conductor zones of the carrier are in contact with other conductor zones of the substrate.

14. A device for measuring radiant energy according to claim 1, configured to take up a position in which the carrier is neither attached to nor in contact with the substrate.

15. A device for measuring radiant energy according to claim 14, configured to take up a position in which the carrier is in levitation with respect to the substrate.

16. A device for reassuring radiant energy according to claim 1, the substrate and the carrier being mechanically attached or linked.

17. A device for measuring radiant energy according to claim 16, the carrier being attached to the substrate by suspending means.

18. A device for measuring radiant energy according to claim 17, the suspending means being flexible.

19. A device for measuring radiant energy according to claim 17, the suspending means being in a thermal insulating material.

20. A device for measuring radiant energy according to claim 1, the substrate and the carrier being mechanically independent.

21. A device for measuring radiant energy according to claim 1, further comprising:
   actuating means for enabling displacement of the first means with respect to the reading means.

22. A device for measuring radiant energy according to claim 21, the actuating means enabling displacement of the carrier.

23. A device for measuring radiant energy according to claim 21, the actuating means enabling displacement of the reading means.

24. A device for measuring radiant energy according to claim 21, the actuating means being at least partly thermomechanical, or piezoelectric, or electromagnetic, or electrostatic.

25. A device for measuring radiant energy according to claim 21, the actuating means including at least one of an electrode belonging to the carrier or an electrode belonging to the substrate.

26. A device for measuring radiant energy according to claim 21, wherein the actuating means is piezoelectric, the reading means being configured to lengthen to enter into contact with the carrier.

27. A device for measuring radiant energy according to claim 1, the reading means being formed of one or more conductor pads.

28. A device for measuring radiant energy according to claim 1, the substrate including one or more circuits for processing the electric signals.

29. A device for measuring radiant energy according to claim 1, the substrate including one or more circuits enabling polarization of the second means.

30. A device for measuring radiant energy according to claim 1, the first means being formed of at least one absorbing layer of electromagnetic radiation.

31. A device for measuring radiant energy according to claim 1, the second means being formed of at least one semi-conductive or metal layer.

32. A device for measuring radiant energy according to claim 31, wherein the second means is formed of at least one semi-conductive layer, the semi-conductive layer adjoining or being integrated in the first means.

33. A device for measuring radiant energy according to claim 1, the second means including one or more thermistors.

34. A device for measuring radiant energy according to claim 1, the substrate further including a layer enabling reflection of the electromagnetic rays.

35. A device for measuring radiant energy according to claim 1, the substrate being a semiconductor.

36. A device for measuring radiant energy according to claim 1, the device for measuring radiant energy being made in thin layers.

37. A MEMS comprising the device according to claim 1.

38. A device for measuring radiant energy comprising:
a carrier including first means allowing absorption of radiant energy, and second means enabling provision of one or more electric signals in relation to the absorbed radiant energy; and
a substrate including reading means for reading the electric signals,
the carrier being mobile relative to the substrate, the reading means being deformable.

39. A device for measuring radiant energy according to claim 38, the first means being movable and the reading means being deformable.

40. A device for measuring radiant energy according to claim 38, configured to take up a position in which the second means is not electrically connected to the reading means.

41. A device for measuring radiant energy according to claim 38, configured to take up a position in which the substrate and the carrier are connected or attached solely by insulating zones belonging to at least one of the carrier or the substrate.

42. A device for measuring radiant energy according to claim 38, configured to take up at least one other position in which conductor zones of the carrier are in contact with other conductor zones of the substrate.

43. A device for measuring radiant energy according to claim 38, configured to take up at least one other position in which conductor zones of the carrier are in contact with the reading means of the substrate.

44. A device for measuring radiant energy according to claim 38, the other position being a position in which the reading means is configured to acquire the electric signals.

45. A device for measuring radiant energy according to claim 38, the carrier being attached to the substrate by suspending means, the suspending means being flexible.

46. A device for measuring radiant energy according to claim 38, the carrier being attached to the substrate by suspending means, the suspending means being in a thermal insulating material.

47. A device for measuring radiant energy according to claim 38, further comprising: actuating means for enabling displacement of the first means with respect to the reading means.

48. A device for measuring radiant energy according to claim 47, the actuating means enabling displacement of the carrier.

49. A device for measuring radiant energy according to claim 47, the actuating means enabling displacement of the reading means.

50. A device for measuring radiant energy according to claim 47, the actuating means being at least partly thermomechanical, or piezoelectric, or electromagnetic, or electrostatic.

51. A device for measuring radiant energy according to claim 47, the actuating means including at least one of an electrode belonging to the carrier or an electrode belonging to the substrate.

52. A device for measuring radiant energy according to claim 38, wherein the actuating means is piezoelectric, the reading means being configured to lengthen to enter into contact with the carrier.

53. A device for measuring radiant energy according to claim 38, the substrate including one or more circuits enabling polarization of the second means.

54. A device for measuring radiant energy according to claim 38, the first means being formed of at least one absorbing layer of electromagnetic radiation.

55. A device for measuring radiant energy according to claim 38, the second means being formed of at least one semi-conductive or metal layer.

56. A device for measuring radiant energy according to claim 38, wherein the second means is formed of at least one semi-conductive layer, the semi-conductive layer adjoining or being integrated in the first means.

57. A device for measuring radiant energy according to claim 38, the second means including one or more thermistors.

58. A device for measuring radiant energy according to claim 38, the substrate further including a layer enabling reflection of the electromagnetic rays.

59. A MEMS comprising the device according to claim 38.

60. A device for measuring radiant energy comprising:
a carrier including a membrane adapted to absorb radiant energy, and a semiconductor layer adapted to convert the absorbed radiant energy into electrical signals; and
a substrate including a connection element adapted to connect to the carrier for reading the electric signals,
wherein the substrate surrounds the carrier and is mechanically joined to the substrate by flexible rods, the carrier being movable relative to the substrate along a horizontal plane in parallel to the substrate.

61. The device for measuring radiant energy according to claim 60, wherein the connection element is deformable to lengthen and retract by a piezo-electric action.

62. A device for measuring radiant energy comprising:
a carrier including a membrane adapted to absorb radiant energy, and a semiconductor layer adapted to convert the absorbed radiant energy into electrical signals; and
a substrate including a connection element adapted to connect to the carrier for reading the electric signals,
wherein the carrier is movable relative to the substrate, and the connection element is deformable.

63. The device for measuring radiant energy according to claim 62, wherein the connection element is deformable to lengthen and retract by a piezo-electric action.

* * * * *